US 6,575,437 B2

(12) United States Patent
Fischer et al.

(10) Patent No.: US 6,575,437 B2
(45) Date of Patent: Jun. 10, 2003

(54) COUNTERFLOW COLUMN WITH A LIQUID DISTRIBUTOR

(75) Inventors: Markus Fischer, Constance (DE); Felix Moser, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/437,987

(22) Filed: Nov. 10, 1999

(65) Prior Publication Data

US 2002/0041040 A1 Apr. 11, 2002

(30) Foreign Application Priority Data

Nov. 30, 1998 (EP) .............................. 98811188

(51) Int. Cl.$^7$ ................................ B01F 3/04
(52) U.S. Cl. ........................ 261/97; 261/110
(58) Field of Search .................. 261/97, 103, 106, 261/110, 112.1, 112.2

(56) References Cited

U.S. PATENT DOCUMENTS

| | | | |
|---|---|---|---|
| 4,427,605 A | | 1/1984 | Meier |
| 4,729,857 A | * | 3/1988 | Lee et al. ............. 261/97 |
| 4,816,191 A | * | 3/1989 | Berven et al. ......... 261/97 |
| 4,855,089 A | * | 8/1989 | Michels ................ 261/97 |
| 5,192,465 A | * | 3/1993 | Petrich et al. ........ 261/97 |
| 5,250,234 A | * | 10/1993 | Meyer et al. .......... 261/97 |
| 5,439,620 A | * | 8/1995 | Maeda ................. 261/97 |
| 5,783,119 A | * | 7/1998 | Ulrich et al. .......... 261/97 |
| 5,906,773 A | * | 5/1999 | Hausch et al. ........ 261/97 |
| 6,293,526 B1 | * | 9/2001 | Fischer et al. ........ 261/97 |

FOREIGN PATENT DOCUMENTS

| | | | |
|---|---|---|---|
| EP | 0070917 A1 | 2/1983 | |
| EP | 0282753 A1 | 9/1988 | |
| EP | 0289201 A1 | 11/1988 | |
| GB | 2163063 A | * 2/1986 | ............. 261/97 |

* cited by examiner

Primary Examiner—C. Scott Bushey
(74) Attorney, Agent, or Firm—Townsend and Townsend and Crew LLP

(57) ABSTRACT

A counterflow column that includes a liquid distributor including a plurality of tubular or trough-like distributor members. The distributor members are arranged in a column above a packing such that a plurality of partial flows develop in an upwardly flowing gas at the level of the distributor members. Stagnation zones are present between the packing and the distributor members. Through screen-off structure, not required per se for a liquid output, the stagnation zones and/or the flow of a liquid to be distributed are influenced such that a liquid, after emerging from the distributor members and prior to entry into the packing, traverses in free fall through the stagnation zones, and where appropriate also further regions, in which the gas flow is largely free of horizontal velocity components. The gas flow may also be influenced by a suitable shaping of the distributor members.

11 Claims, 3 Drawing Sheets

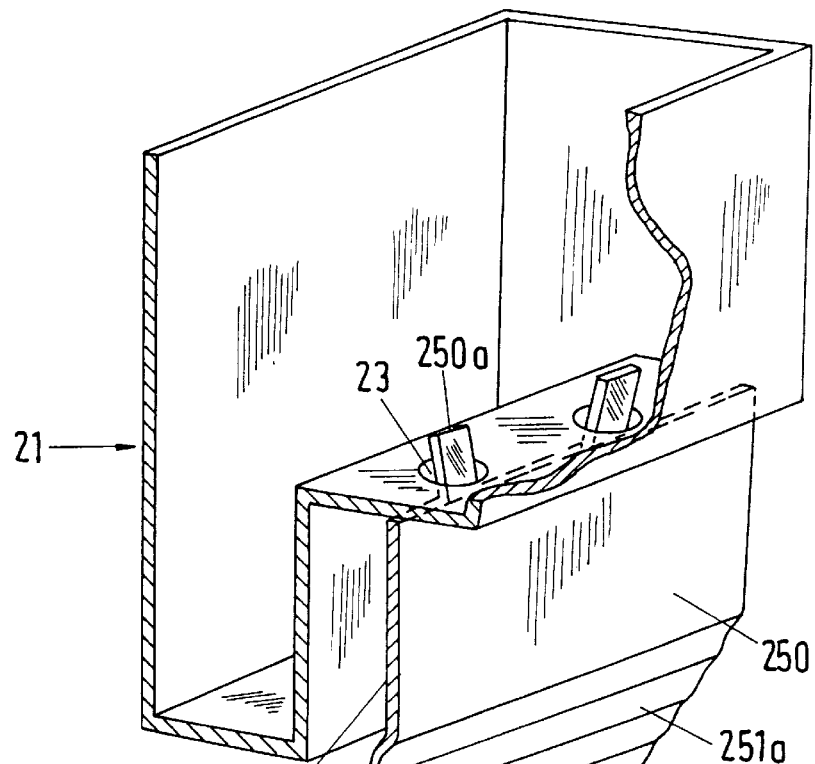
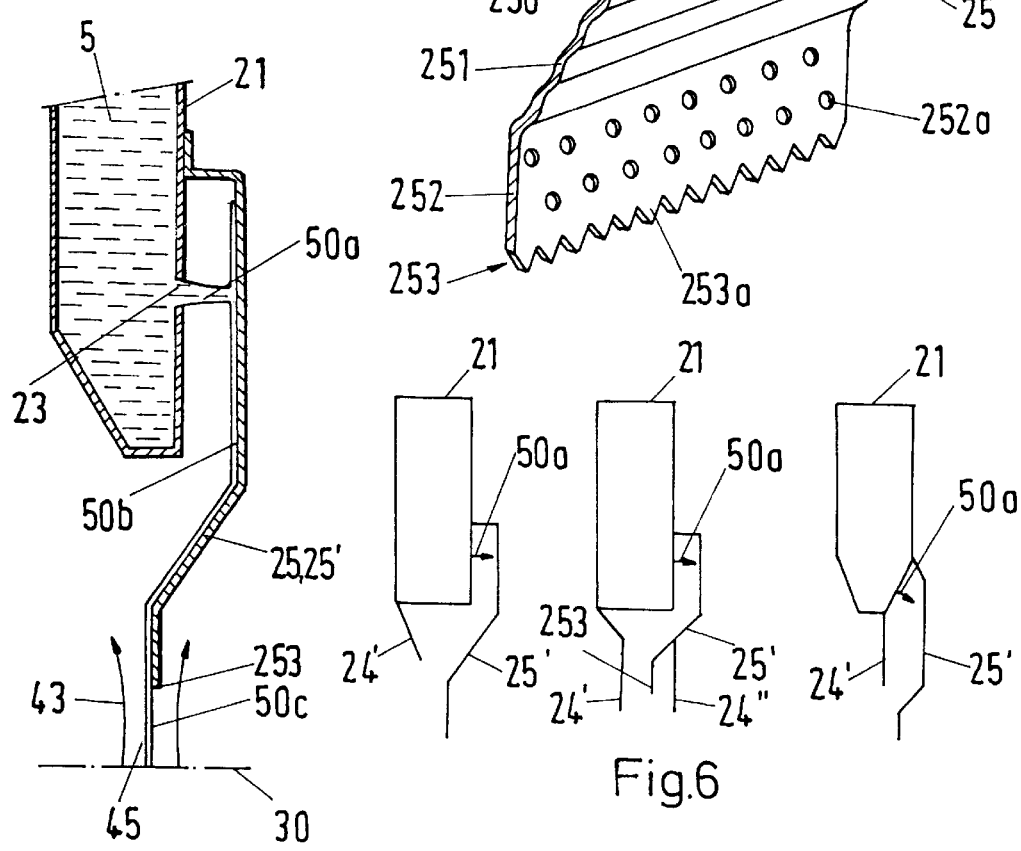

COUNTERFLOW COLUMN WITH A LIQUID DISTRIBUTOR

BACKGROUND

1. Field of the Invention

The invention relates to a counterflow column with a liquid distributor.

2. Description of the Prior Art

In a column of this kind in which for example a distillatory material separation is carried out by means of an ordered packing, a gas which flows upwardly through the packing can move so rapidly that when known liquid distributors are used (see e.g. EP 0 282 753) fine drops are separated at the latter by the vigorous gas flow and are carried along. The liquid to be distributed therefore does not arrive without losses at the packing, but rather is partly conducted away from the latter by the gas flow (often called "entrainment"). Ordered packings in which strong gas flows can arise are for example turbulence packings (see EP 0 418 338) or packings with cross channel structure, i.e. packings with films arranged in vertical layers which are corrugated and thereby form openly crossing channels (see e.g. EP 070 917).

SUMMARY OF THE INVENTION

The object of the invention is to create a counterflow column with a liquid distributor in which the output of a liquid to be distributed onto the packing takes place largely without losses.

The counterflow column contains a liquid distributor which comprises a plurality of tubular or trough-like distributor members. These distributor members are arranged in the column above the packing in such a manner that in an upwardly flowing gas a plurality of partial flows develop at the level of the distributor member. Stagnation zones are present between the packing and the distributor members. Through additional means which are not necessary per se for a liquid output the stagnation zones and/or the flow of a liquid to be distributed are influenced in such a manner that the liquid, after emerging from the distributor members and prior to entry into the packing, traverses in free fall the stagnation zones and where appropriate also further regions in which the gas flow is largely free of horizontal velocity components. The gas flow can also be influenced by means of a suitable shaping of the distributor members.

BRIEF DESCRIPTION OF THE DRAWINGS

FIG. 4 illustrates a trough-like distributor member of a column in accordance with the invention, FIG. 5 illustrates a second exemplary embodiment of a trough-like distributor member, FIG. 6 illustrates three further variants.

DESCRIPTION OF SPECIFIC EXEMPLARY EMBODIMENTS

Figure 1:
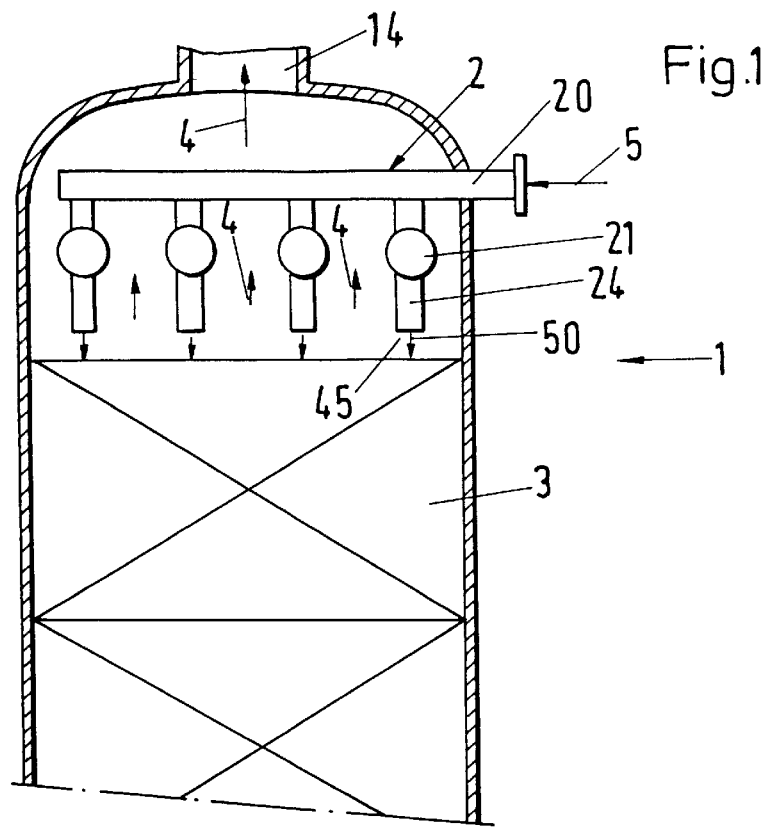
FIG. 1 illustrates the upper part of a counterflow column in accordance with the invention.

The column 1 shown in FIG. 1 comprises a liquid distributor 2 with distributor members 21 and a packing 3, through which a gas 4 flows upwards to a draw-off tube 14. In the distributor 2 a liquid 5 is supplied via a tube 20 to the individual distributor members 21. The gas 4 is temporarily separated into partial flows 40 in the region of the distributor members 21. Accordingly, stagnation zones 45 develop in the region between the packing 3 and the distributor members 21. A screen-off means 24 influences the flow of the gas 4 in such a manner that the latter is largely free of horizontal velocity components below the distributor member 21 in a zone which the liquid 5 traverses as a freely falling liquid 50. Drops 50' of the liquid 50 (see FIG. 2) are therefore not carried upwards by the gas 4. The liquid arrives without losses onto the packing 3.

Figure 2:
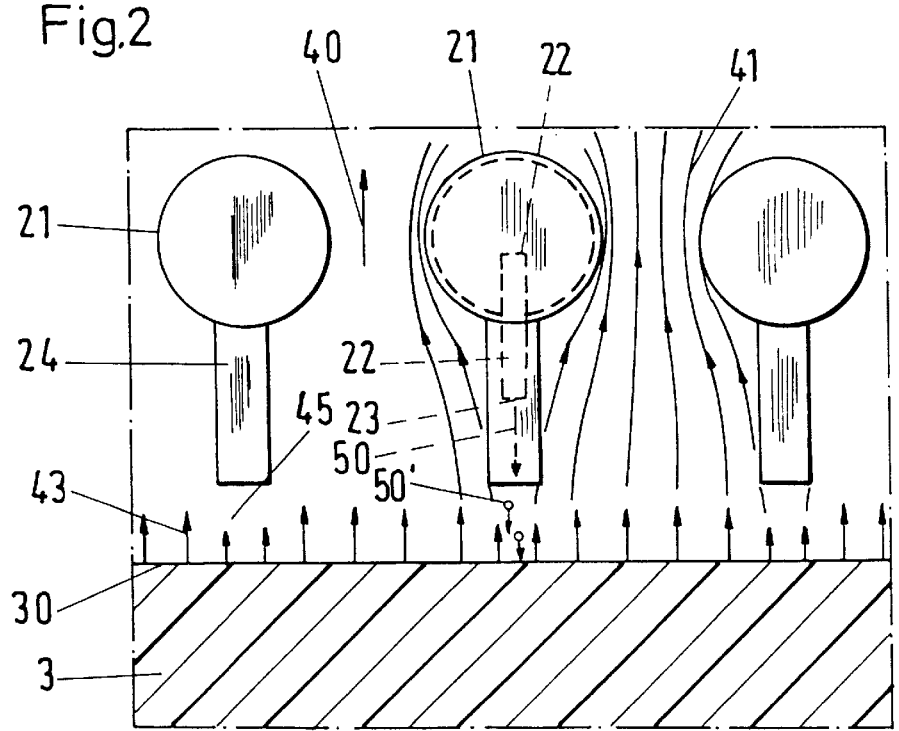
FIG. 2 illustrates distributor members of the column of FIG. 1 with an illustration of the gas flow.

In FIG. 2 the relationships in the flowing gas 4 are qualitatively illustrated in a zone above the surface 30 of the packing 3 by flow lines 41 which are drawn in. The gas emerges largely uniformly from the packing (arrows 43). The liquid 5 to be distributed is given off by the distributor members 21 via a plurality of tubelets 22 and through outlet openings 23. The screen-off means 24 influence the gas flow in such a manner that stagnation zones 45 develop beneath the openings 23. The liquid 5 to be distributed, which can break up into drops 50', is incident without losses at the packing 3. The freely falling liquid 50 can also be present in the form of jets or curtain-like films.

Figure 3:
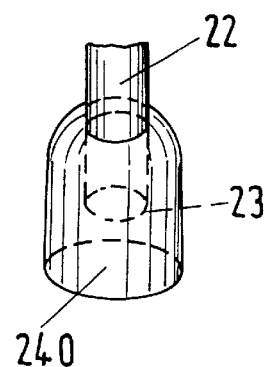
FIG. 3 illustrates a screened off outlet point of a distributor member.

The screen-off means 24 can be wall elements which extend in each case over the entire length of the distributor members 21. They can however also in each case be associated with only one outlet opening 23, such as is the case with the bell-shaped screening-off means 240 shown in FIG. 3. What is important in these screen-off means 24 is that their inner surface is not wetted by the liquid 50 which is given off, because such a routed liquid would arrive at lower edges of the screen-off means 24, drip off there and be caught by the gas flow 43, with it being possible for a portion of the liquid to be carried along as a result of horizontal velocity components.

A trough-like distributor member 21 is illustrated sectionally in FIG. 4 in which a guide wall 25 via which the liquid 5 can flow off at both sides in the form of films is arranged to follow openings 23 through which the liquid 5 is given off. The guide wall 25 has a structuring for the favorable influencing of the liquid films: grooves 251a and perforations 252a influence the horizontal distribution of the films. These structuring elements need not be present in combination, but can also be provided at other locations of the guide wall 25 or can be omitted. The drip edge 253 is provided with teeth 253a, but can also be a smooth horizontal edge.

The guide wall 25 has in a vertical section, which is perpendicular to the longitudinal extent of the distributor member 21, substantially the shape of a sigmoid curve, i.e. a curve which has a turning point of its curvature. This curve is largely given by a tractor curve in the illustrated example. A vertical wall section 250 merges into a wall section 251 which is inclined towards the middle of the distributor member 21; a second vertical wall section 252 adjoins at the latter, the lower edge of which forms a drip edge 253. At the upper edge of the wall section 250 lug-like sections 250a serve as securing means for the guide wall 24 and as guide means for a liquid to be given off. Other securing methods are of course also possible.

In the exemplary embodiment of FIG. 5 the guide wall 25 is formed as a baffle wall 25'. The liquid 5 flowing out of the opening 23 is incident in the form of jets (jet 50a) onto the baffle wall 25' and in this transforms into a film 50b which subsequently arrives in free fall from the drip edge 253 through a stagnation zone 45 at the surface 30 of the packing 3.

The distributor member 21 and the guide wall 25 or baffle wall 25' are advantageously shaped in such a manner that the flow 43 is largely formed mirror symmetrically in the vicinity of the stagnation zone 45, namely with the vertical plane through the drip edge 253 as a symmetry plane. In order to achieve this the baffle wall 25' is shaped as a sigmoid and the left flank 214 of the distributor member 21 is chamfered in so that its trough contracts downwardly in the shape of a wedge in the lower region.

The guide wall 25 or baffle wall 25' is for example screwed on, welded on (e.g. point welding) or soldered on at the distributor member 21.

FIG. 6 shows in a very schematic manner three examples of distributor members 21 in which at least one apron 24' is additionally provided flanking the guide wall 25 for the purpose of influencing the gas flow. In the second example the drip edge 253 is located in a protected region between two aprons 24' and 24". The liquid 50a, which is given off in the form of a jet, is indicated by arrows.

Figure 7:
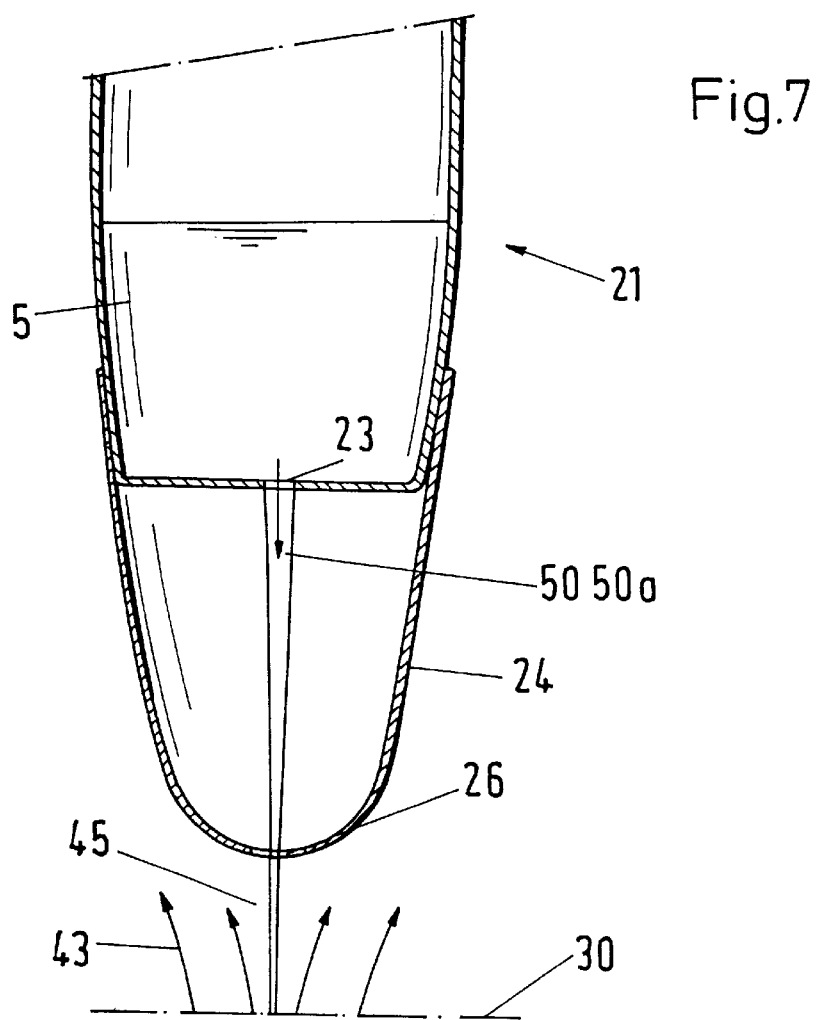
FIG. 7 illustrates a distributor member with freely falling liquid jets and deflection or displacement bodies for the gas flow.

In FIG. 7 the outlet region of a distributor member 21 is illustrated, the screen-off means 24 of which is a displacer body which is formed of a film which is bent in a parabolic manner. The liquid 50 which flows off through the base opening 23 traverses an aperture 26 of the displacer body 24 as a jet 50a without coming into contact with its surface and moves onward through the stagnation zone 45 of the gas flow 43 to the packing surface 30.

The distance between the distributor member 21, in particular the crown of the displacer body 24, and the packing surface 30 is advantageously chosen so great that the stagnation zone 45 comes to lie largely outside the packing 3. At such a distance the flow relationships in the packing 3 are not unfavorably influenced by the distributor member.

Figure 8:
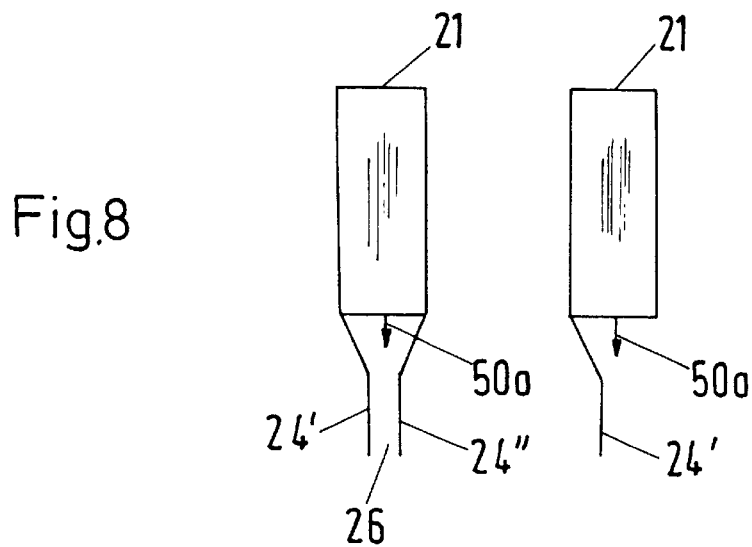
FIG. 8 illustrates two further variants of distributor members.

Instead of the displacer body 24 in FIG. 7, two aprons 24', 24" can also be provided, as is illustrated in the first example of FIG. 8. Even a single apron 24'—second example of FIG. 8—can be sufficient in moderate gas flows in order to obtain a loss-free liquid output.

What is claimed is:

1. A counterflow column comprising a liquid distributor including a plurality of tubular distributor members that are arranged in a column above a packing in such a manner that a plurality of partial flows develop in an upwardly flowing gas at a level of the distributor members, with stagnation zones resulting between the packing and the distribution members, wherein the shape of the distributor is chosen and screen-off means are provided in order to influence the gas flow such that after the liquid emerges from the distributor members and prior to entry into the packing the liquid, traverses in free fall through the stagnation zones where the liquid encounters only gas flow that is largely free of horizontal velocity components.

2. A column in accordance with claim 1 wherein for the output of liquid, guide walls via which the liquid flows off in the form of films are arranged to follow openings of the distributor members.

3. A column in accordance with claim 2 wherein the guide walls are formed as baffle plates for liquid jets that emerge from the openings.

4. A column in accordance with claim 2 wherein the guide wall has a structuring that has an effect on the liquid film that influences its horizontal distribution, and wherein a drip edge may be designed in a zigzag shape.

5. A column in accordance with claim 2 wherein in a vertical section that is perpendicular to the longitudinal extent of the distributor member, the guide wall has a shape of a sigmoid curve.

6. A column in accordance with claim 5 wherein the sigmoid curve is at least partly given by a tractor curve.

7. A column in accordance with claim 1 wherein the distributor member is trough shaped and has a chamfered-in flank for influencing of the gas flow.

8. A column in accordance with claim 2 wherein at least one apron is provided at a distributor member flanking the guide wall for influencing of the gas flow.

9. A column in accordance with claim 1 wherein distances between the distributor members and the packing surface is such that the stagnation zones lie largely outside the packing.

10. A column in accordance with claim 1 wherein a region of the stagnation zones, the partial flows are largely mirror symmetrically formed with respect to one another and with respect to vertical planes through drip edges.

11. A column in accordance with claim 8 wherein the distributor is arranged above a packing that has an ordered structure.

* * * * *